United States Patent
Marsh et al.

(10) Patent No.: US 12,058,621 B2
(45) Date of Patent: Aug. 6, 2024

(54) VEHICLE-TO-EVERYTHING (V2X) MESSAGE MONITORING

(71) Applicant: QUALCOMM Incorporated, San Diego, CA (US)

(72) Inventors: Gene Wesley Marsh, San Diego, CA (US); Dan Vassilovski, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 211 days.

(21) Appl. No.: 17/308,860

(22) Filed: May 5, 2021

(65) Prior Publication Data
US 2021/0352590 A1    Nov. 11, 2021

Related U.S. Application Data

(60) Provisional application No. 63/020,867, filed on May 6, 2020.

(51) Int. Cl.
*H04W 52/02* (2009.01)
*G01D 21/02* (2006.01)
(Continued)

(52) U.S. Cl.
CPC ........ *H04W 52/0261* (2013.01); *G01D 21/02* (2013.01); *G01P 13/00* (2013.01); *H04W 4/40* (2018.02)

(58) Field of Classification Search
CPC ..... H04W 52/0261; H04W 4/40; H04W 4/24; H04W 4/027; H04W 4/90; H04W 4/12;
(Continued)

(56) References Cited

U.S. PATENT DOCUMENTS

| 10,235,882 B1 * | 3/2019 | Aoude | G08G 1/093 |
| 2015/0035685 A1 * | 2/2015 | Strickland | B60Q 5/006 |
| | | | 340/901 |

(Continued)

FOREIGN PATENT DOCUMENTS

WO    WO-2017136627 A1 *   8/2017

OTHER PUBLICATIONS

Fbconsulting S A R L: "Draft—DTR/ITS-00165 v0.0.9 (TR 103 300) VRU Study", ETSI Draft, ITSWG1(17)039007, European Telecommunications Standards Institute (ETSI), 650, Route Des Lucioles, F-06921 Sophia-Antipolis, France ,No. 0.8, Mar. 28, 2017 (Mar. 28, 2017), pp. 1-46, XP014289870, Retrieved from the Internet: URL: docbox.etsi.org\ITS\ITSWG1\05-CONTRIBUTIONS\2017\ITSWG1(17)039007_Draft_-_DTR_ITS-00165_v0_0_9_TR__103_300___VRU_study_\ITS-00165v009.docx [retrieved on Mar. 28, 2017], the whole document.

(Continued)

*Primary Examiner* — Tejis Daya
(74) *Attorney, Agent, or Firm* — Norton Rose Fullbright US LLP

(57) ABSTRACT

This disclosure provides systems, methods, and apparatuses, including computer programs encoded on computer storage media, for wireless communication. In one aspect of the disclosure, a method for wireless communication by a user equipment (UE) includes monitoring for one or more vehicle-to-everything (V2X) messages based on a first monitoring interval, and determining a second monitoring interval based on a UE characteristic, an environment characteristic, or a combination thereof. The method may also include monitoring for the one or more V2X messages based on the second monitoring interval. Other aspects and features are also claimed and described.

27 Claims, 9 Drawing Sheets

(51) Int. Cl.
*G01P 13/00* (2006.01)
*H04W 4/40* (2018.01)

(58) Field of Classification Search
CPC ........ G01D 21/02; G01P 13/00; Y02D 30/70; G08G 1/005; G08G 1/0112; G08G 1/0116; G08G 1/012; G08G 1/015; G08G 1/052; G08G 1/096775; G08G 1/096783; G08G 1/096791; G08G 1/161; G08G 1/163; G08G 1/166; G06N 20/00
See application file for complete search history.

(56) References Cited

U.S. PATENT DOCUMENTS

| | | | | |
|---|---|---|---|---|
| 2016/0295624 | A1* | 10/2016 | Novlan | H04L 67/12 |
| 2017/0243485 | A1* | 8/2017 | Rubin | G08G 1/052 |
| 2018/0035276 | A1* | 2/2018 | Kang | H04W 72/02 |
| 2018/0262865 | A1 | 9/2018 | Lepp et al. | |
| 2018/0322785 | A1* | 11/2018 | Jerichow | G08G 1/162 |
| 2020/0084738 | A1* | 3/2020 | Nguyen | H04W 4/40 |
| 2020/0196321 | A1* | 6/2020 | Zhang | H04W 72/21 |
| 2022/0322486 | A1* | 10/2022 | Park | H04W 76/14 |

OTHER PUBLICATIONS

Huawei, et al., "Power Consumption Analysis of PC5 V2P", 3GPP Draft, 3GPP TSG RAN WG1 Meeting #85, R1-164819, 3rd Generation Partnership Project (3GPP), Mobile Competence Centre, 650, Route Des Lucioles, F-06921, Sophia-Antipolis Cedex, France, vol. RAN WG1, No. Nanjing, China, May 23, 2016-May 27, 2016, May 14, 2016 (May 14, 2016), XP051089913, 4 pages, Retrieved from the Internet: URL: http://www.3gpp.org/ftp/tsg_ran/WG1_RL1/TSGR1_85/Docs/ [retrieved on May 14, 2016] the whole document.

International Search Report and Written Opinion—PCT/US2021/031140—ISA/EPO—Sep. 1, 2021 (203324WO).

Qualcomm Incorporated: "PC5 for V2P", 3GPP Draft, 3GPP TSG-RAN WG1 #85, R1-164455_QC_V2X_V2P_PC5, 3rd Generation Partnership Project (3GPP), Mobile Competence Centre, 650, Route Des Lucioles, F-06921, Sophia-Antipolis Cedex, France, vol. RAN WG1, No. Nanjing, China, May 23, 2016-May 27, 2016, May 14, 2016 (May 14, 2016), XP051096439, 4 pages, Retrieved from the Internet: URL: http://www.3gpp.org/ftp/tsg_ran/WG1_RL1/TSGR1_85/Docs/ [retrieved on May 14, 2016] the whole document.

* cited by examiner

VEHICLE-TO-EVERYTHING (V2X) MESSAGE MONITORING

CROSS-REFERENCE TO RELATED APPLICATIONS

This application claims the benefit of U.S. Provisional Patent Application No. 63/020,867, entitled, "VEHICLE-TO-EVERYTHING (V2X) MESSAGE MONITORING," filed on May 6, 2020, which is expressly incorporated by reference herein in its entirety.

TECHNICAL FIELD

Aspects of the present disclosure relate generally to wireless communication systems, and more particularly, to vehicle-to-everything (V2X) message monitoring.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Vehicle-to-everything (V2X) technology enables sharing of information from a vehicle to another device or entity that may affect the vehicle, and vice versa. V2X technology is associated with a vehicular communication system that can include one or more aspects or types of communication, such as vehicle-to-vehicle (V2V), vehicle-to-infrastructure (V2I), vehicle-to-network (V2N), vehicle-to-pedestrian (V2P), vehicle-to-device (V2D), and vehicle-to-grid (V2G), as illustrative, non-limiting examples. V2X technology can utilize cellular based communication or wireless local area network communication. In some implementations, messages and communication for the V2X technology are at an application and use an underlying radio as pipe (a communication path).

V2X-capable vehicles periodically broadcast their current status using application-layer messages such as the Basic Safety Message (BSM) or Cooperative Awareness Messages (CAM), nominally transmitted at a 100 milliseconds (ms) periodicity. These transmissions constitute the V2X basic safety capability, and at a minimum include vehicle identity, location, and motion state. In addition to basic safety, standards bodies, such as Society of Automotive Engineers (SAE), European Telecommunications Standards Institute (ETSI)-European Telecommunication Standard (ETS), and Chinese Standards Association, Society of Automotive Engineers of China (CSAE), are developing application-layer standards for advanced features including sensor-sharing (such as dissemination of detected vehicles or objects) and coordinated driving (such as sharing and negotiating intended maneuvers). Such messages may be detected may on or more UEs and used to alert a vulnerable road users (VRU), such as pedestrians, cyclists, and other micro-mobility user (e.g., scooter, Segway, etc.), to the presence of one or more vehicles. As compared to a roadway vehicle, such as a car, truck, or other vehicle that includes an alternator, a UE typically includes a storage device, such as a battery, which can be sensitive to power consumption. Frequent or continuous monitoring of V2X application-layer messages can present an unacceptable power drain (battery drain) for the UE.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a user equipment (UE). The method includes monitoring for one or more vehicle-to-everything (V2X) messages based on a first monitoring interval. The method also includes determining a second monitoring interval based on a UE characteristic, an environment characteristic, or a combination thereof, and monitoring for the one or more V2X messages based on the second monitoring interval.

Another innovative aspect of the subject matter described in this disclosure can be implemented in a UE. The UE includes at least one processor and a memory coupled with the at least one processor and storing processor-readable instructions that, when executed by the at least one processor, is configured to monitor, based on a first monitoring interval, for one or more V2X messages; determine a second monitoring interval based on a UE characteristic, an environment characteristic, or a combination thereof; and monitor, based on the second monitoring interval, for the one or more V2X messages.

Another innovative aspect of the subject matter described in this disclosure can be implemented in an apparatus configured for wireless communication. The apparatus includes means for means for monitoring for one or more V2X messages based on a first monitoring interval. The apparatus also includes means for determining a second monitoring interval based on a UE characteristic, an environment characteristic, or a combination thereof, and means for monitoring for the one or more V2X messages based on the second monitoring interval.

Another innovative aspect of the subject matter described in this disclosure can be implemented in a non-transitory computer-readable medium storing instructions that, when executed by a processor, cause the processor to perform operations including monitoring for one or more V2X messages based on a first monitoring interval; determining a second monitoring interval based on a UE characteristic, an environment characteristic, or a combination thereof; and monitoring for the one or more V2X messages based on the second monitoring interval.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

Figure 1:
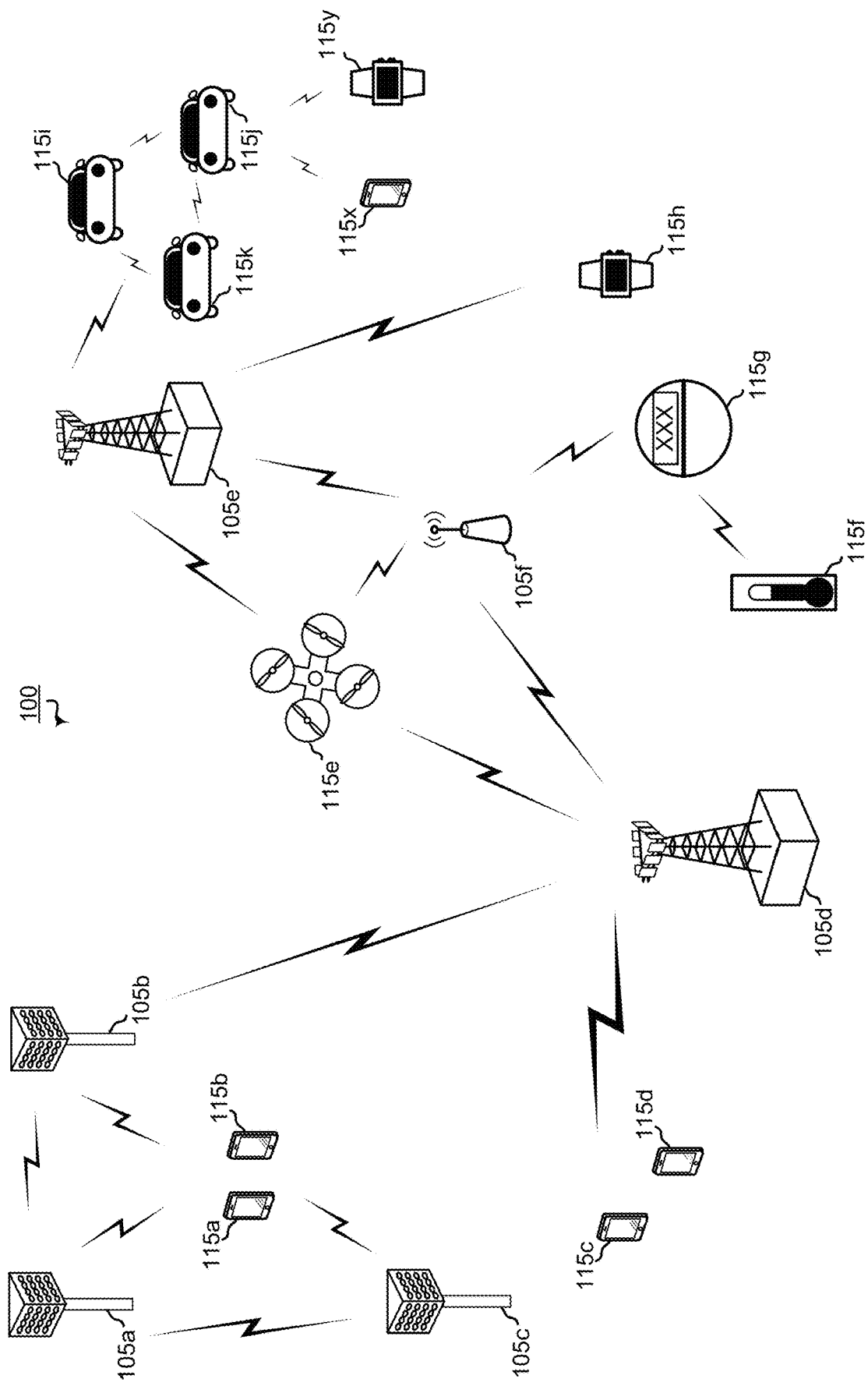
FIG. 1 is a block diagram illustrating details of an example wireless communication system.

The Appendix provides further details regarding various embodiments of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The present disclosure provides systems, apparatus, methods, and computer-readable media for monitoring one or more V2X messages. To illustrate, a user equipment (UE) may dynamically adjust a V2X monitoring interval based on one or more characteristics, such UE characteristic, an environment characteristic, or a combination thereof. Each of the UE characteristic and the environment characteristic may be static or dynamic. For example, the UE may monitoring, based on a first monitoring interval, for one or more vehicle-to-everything (V2X) messages based on a first monitoring interval. Additionally, the UE may determining a second monitoring interval based on a UE characteristic, an environment characteristic, or a combination thereof, and monitor for the one or more V2X messages based on the second monitoring interval. To illustrate, when the UE is located in an urban environment, adjacent to a roadway or intersection, may need to monitor more frequently than when the UE is located in a rural environment. As another example, a UE associated with a cyclist or a micro-mobility unit travelling on a road, or in a designated micro-mobility lane, may monitor more frequently than a pedestrian on a sidewalk. Additionally, or alternatively, the UE may determine the V2X monitoring interval based on a motion type/status of the UE. For example, the motion type/status may indicate whether the UE is associated with walking, jogging, cycling, or motored travel, as illustrative, non-limiting examples.

Particular implementations of the subject matter described in this disclosure can be implemented to realize one or more of the following potential advantages. In some aspects, the present disclosure provides the UE with dynamic adjustment of a monitoring interval. By adjusting the monitoring interval, such as a V2X message monitoring interval, the UE may monitor for one or more V2X messages may dynamically determine an appropriate monitoring interval for real-time conditions. Accordingly, the UE may frequently monitor for V2X message is hazardous situations and may monitor less frequently in relatively non-hazardous situations. By adjusting the monitoring interval, such as a V2X message monitoring interval, the UE may expend power in manner appropriate for a current situation.

This disclosure relates generally to providing or participating in authorized shared access between two or more wireless communications systems, also referred to as wireless communications networks. One or more aspects of the wireless communication networks described herein may be used or incorporated into a V2X system. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS/GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification.

3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes/km2), ultra-low complexity (such as ~10 s of bits/sec), ultra-low energy (such as ~10+ years of battery life), and deep coverage with the capability to reach challenging locations; (2) including mission-critical control with strong security to safeguard sensitive personal, financial, or classified information, ultra-high reliability (such as 99.9999% reliability), ultra-low latency (such as ~1 millisecond (ms)), and users with wide ranges of mobility or lack thereof; and (3) with enhanced mobile broadband including extreme high capacity (such as ~10 Tbps/km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR. Additionally or alternatively, certain aspects of the apparatus and techniques described herein, such as LET implementations, 5G NR implementations, other wireless communication implementations, or a combination thereof, may be used for V2X communication.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects are described herein by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects or uses may come about via integrated chip embodiments or other non-module-component based devices (such as end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice. It is intended that innovations described herein may be practiced in a wide variety of implementations, including both large/small devices, chip-level components, multi-component systems (such as RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device to device or peer to peer or ad hoc network arrangements, etc.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple cells, such as two cells, three cells, four cells, and the like.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the embodiment illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of embodiments supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e. Additionally, V2V mesh network may include or correspond to a vehicle-to-everything (V2X) network between UEs 115i-115k and one or more other devices, such as UEs 115x, 115y.

Figure 2:
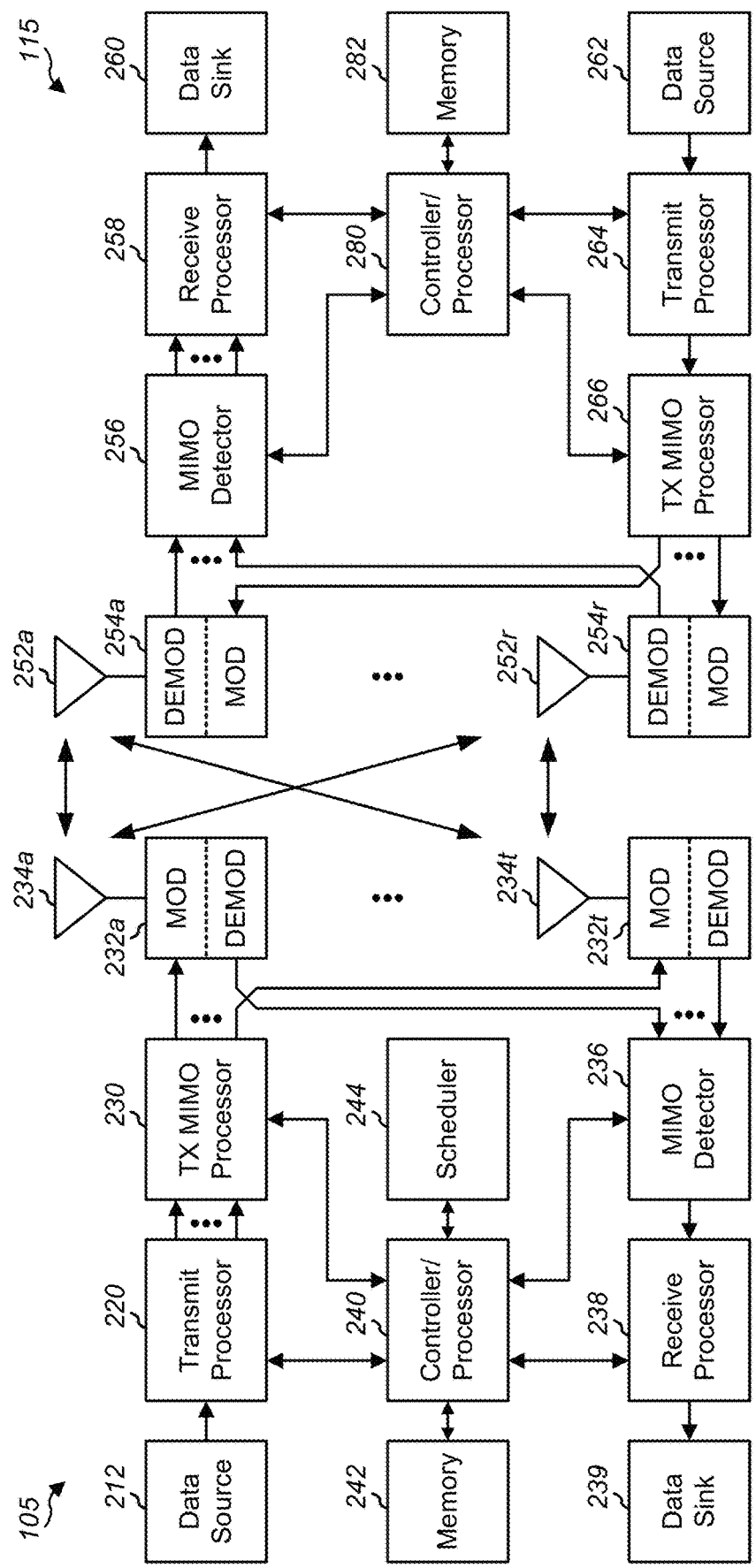
FIG. 2 is a block diagram conceptually illustrating an example design of a base station and a user equipment (UE).

FIG. 2 is a block diagram conceptually illustrating an example design of a base station 105 and a UE 115. Base station 105 and UE 115 may be one of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Additionally, base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Transmit processor 220 may process, such as encode and symbol map, the data and control information to obtain data symbols and control symbols, respectively. Additionally, transmit processor 220 may also generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, etc., to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples, such as for OFDM, etc., to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for UE 115 to data sink 260, and provide decoded control information to controller/processor 280. For example, to process the detected symbols, the receive processor 258 may demodulate, deinterleave, and decode the detected symbols.

On the uplink, at UE 115, transmit processor 264 may receive and process data (such as for the physical uplink shared channel (PUSCH)) from data source 262 and control information (such as for the physical uplink control channel (PUCCH)) from controller/processor 280. Transmit processor 264 may also generate reference symbols for a reference signal. The symbols from transmit processor 264 may be precoded by TX MIMO processor 266 if applicable, further processed by modulators 254a through 254r (such as for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 3-11, or other processes for the techniques described herein. Memories 242 and 282 may store data and program codes for base station 105 and UE 115, respectively. Scheduler 244 may schedule UEs for data transmission on the downlink or uplink.

Wireless communications systems operated by different network operating entities (such as network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (such as time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed, such as contention-based, frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Figure 3:
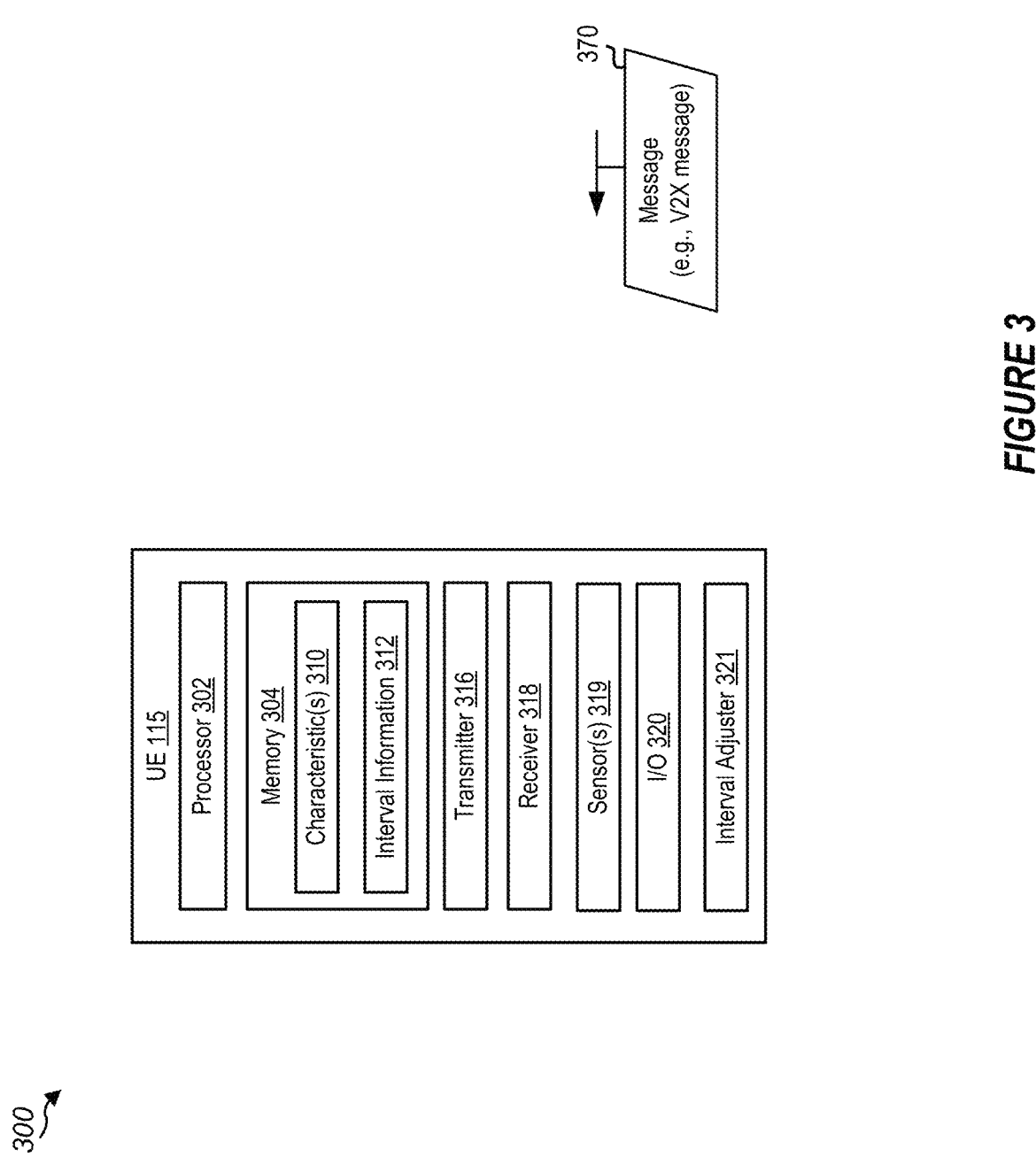
FIG. 3 is a block diagram illustrating an example wireless communication system for vehicle-to-everything (V2X) message monitoring.

FIG. 3 is a block diagram of an example wireless communications system 300 for (V2X) message monitoring. In some examples, wireless communications system 300 may implement aspects of wireless network 100. Wireless communications system 300 includes the UE 115, a network entity 350, and a V2X entity 360. Network entity 350 may include or correspond to the base station 105, a network, a network core, or another network device, as illustrative, non-limiting examples. V2X entity 360 may include or correspond to a UE 115 as described with reference to FIGS. 1 and 2. For example, V2X entity 360 may include or correspond to UEs 115i, 115j, 115k to FIG. 1. Although one UE, one network entity, and one V2X entity are illustrated, in some other implementations, wireless communications system 300 may generally include multiple UEs, may include more than one network entity, and may include no or multiple V2X entities.

In some implementations, wireless communication system 300 includes a V2X wireless communication system. V2X is a communication system in which information is passed between a vehicle and other entities within the wireless communication network that provides the V2X services. The V2X services may include services for Vehicle-to-Vehicle (V2V), Vehicle-to-Pedestrian (V2P), Vehicle-to-Infrastructure (V2I), and Vehicle-to-Network (V2N). One or more V2X standards aim to develop or support an Advanced Driver Assistance System (ADAS), which assist a driver with critical decisions, such as lane changes, speed changes, overtaking speeds, etc. Low latency communications may be used in V2X and, are therefore suitable for precise positioning. For example, positioning techniques, such as time of arrival (TOA), time difference of arrival (TDOA) or observed time difference of arrival (OTDOA), or any other cellular positioning technique, may be enhanced using assistance from V2X.

In general, there are two modes of operation for V2X services, as defined in Third Generation Partnership Project (3GPP) TS 23.285. One mode of operation uses direct wireless communications between V2X entities when the V2X entities are within range of each other. The other mode of operation uses network based wireless communication between entities. The two modes of operation may be combined or other modes of operation may be used if desired.

The wireless communication of a V2X wireless communication system may be over Proximity-based Services (ProSe) Direction Communication (PC5) reference point as defined in 3GPP TS 23.303, and may use wireless communications under Institute of Electrical and Electronics Engineers (IEEE) 1609, Wireless Access in Vehicular Environments (WAVE), Intelligent Transport Systems (ITS), and IEEE 802.11p, on the ITS band of 5.9 GHz, or other wireless connections directly between entities.

The UE 115 can include a variety of components (such as structural, hardware components) used for carrying out one or more functions described herein. For example, these components can include one or more processors 302 (hereinafter referred to collectively as "processor 302"), one or more memory devices 304 (hereinafter referred to collectively as "memory 304"), one or more transmitters 316 (hereinafter referred to collectively as "transmitter 316"), one or more receivers 318 (hereinafter referred to collectively as "receiver 318"), one or more sensors 319 (hereinafter referred to collectively as "sensor 319"), one or more I/Os 320 (hereinafter referred to collectively as "I/O 320"), and an interval adjuster 321. The processor 302 may be configured to execute instructions stored in the memory 304 to perform the operations described herein. In some implementations, the processor 302 includes or corresponds to one or more of the receive processor 258, the transmit processor 264, and the controller/processor 280, and the memory 304 includes or corresponds to the memory 282.

Memory 282 includes one or more characteristics 310 (hereinafter referred to collectively as "characteristic 320") and interval information 312. Characteristics 310 may include UE characteristics and environment characteristics of UE 115. Each of the UE characteristics and the environment characteristics may include static characteristics, dynamic characteristics, or a combination thereof.

The UE static characteristics may include a device type, a mobility type, one or more device capabilities, a user input. The device type may include or indicate whether UE 115 is a phone, a watch, a micro-mobility unit, another device, or a combination thereof, non-limiting examples. The mobility type may indicate whether movement of UE 115 is associated with a pedestrian, a bicycle, a scooter, a Segway, a micro-mobility unit, or the like, as illustrative, non-limiting examples. The one or more device capabilities may include or indicate a power source capability of UE 115, a communication capability of UE 115, another capability, or a combination thereof, as illustrative, non-limiting examples. The user input may include or indicate one or more of the above UE static characteristics or another characteristic, such as a minimum monitoring interval, a maximum monitoring interval, activation of machine learning, a user specified monitoring interval for one or more static or dynamic characteristics (for either or both of the UE characteristics or the environment characteristics), or a combination thereof, as illustrative, non-limiting examples.

The UE dynamic characteristics may include a location, a time, motion state information, sensor information, operating information, or a combination thereof, as illustrative, non-limiting example. The location may indicate a geographic location of UE 115 and the time may indicate a current or general time (e.g., morning, afternoon, rush hour, etc.). The motion state information may indicate whether or not UE 115 is in motion. If UE 115 is in motion, the motion state information may indicate speed, direction, velocity, acceleration, the like, or a combination thereof, as illustrative, non-limiting information. The sensor information may include data from one or more sensors of UE 115. For example, the data may include temperature data, image data, audio data, ultrasound data, infrared data, the like, or a combination thereof. The operating information may include or indicate a status of one or more components of UE 115. For example, the operating information may indicate a power level of a battery supply, whether a battery is being charged, a temperature of UE 115, or a combination thereof, as illustrative, non-limiting examples.

The environment static characteristics may include map information, roadway information, walkway information, topography information, injury/accident information, other information (e.g., construction information), or a combination thereof, as illustrative, non-limiting examples. The map information may include map data. The roadway information may include information of one or more roadways or intersection, such as number of lanes, speed limit, turn lanes, pedestrian lanes, bus lanes, traffic lights, signage, the like, or a combination thereof, as illustrative non-limiting examples. The walkway information may indicate a type of walkway (e.g., sidewalk, mixed use—people and bicycles), a material of the walkway, presence of a barrier, the like, or a combination thereof. The topography information may include or indicate elevation data for one or more geographic locations. The injury/accident information may include historical data (e.g., time, place, severity, weather conditions, etc.) of an injury or an accident at one or more geographic locations. The environment dynamic characteristics may include traffic information, weather information, emergency information, one or more received V2X messages, or a combination thereof. The traffic information may include or indicate obstacles, road closures, traffic congestion, detours, construction, the like, or a combination thereof. The weather information may indicate current or historical weather information, such as temperature, visibility, travel conditions, the like, or a combination thereof. The emergency information may include or indicate hazard information, such as police information, fire information, amber alert, silver alert, the like, or a combination thereof. The one or more V2X messages may include or indicate the traffic information, the weather information, the emergency information, a BSM, a CAM, a Decentralized Notification Message (DENM), the like, or a combination thereof, as illustrative, non-limiting examples.

Interval information 312 may be associated with or indicate an interval for monitoring for one or more V2X messages. Interval information 312 may include a monitoring duration and an interval duration. The monitoring duration may corresponding to a monitoring time period and indicate a duration for monitoring for one or more V2X messages. The interval duration may indicate a time period corresponding to a pair of consecutive monitoring time periods, such as a first monitoring time period and a second monitoring time period. For example, the interval duration may correspond to a time period between an end of the first monitoring time period and a start of the second monitoring time period. As another example, the interval duration may correspond to a time period between a start of the first monitoring time period and a beginning of the second monitoring time period. In some implementations, interval information 312 may indicate a duty cycle for monitoring for V2X messages, such as cycle of operation of monitoring for V2X messages and not monitoring for V2X messages. In some implementations, the duty cycle may indicate ratio between monitoring time and total time, such as a percentage of time that UE 115 monitors for V2X messages when V2X capabilities are active.

The transmitter 316 is configured to transmit data to one or more other devices, and the receiver 318 is configured to receive data from one or more other devices. For example, the transmitter 316 may transmit data to, and the receiver 318 may receive data from, the network entity 350. In some implementations, the transmitter 316 and the receiver 318 may be integrated in one or more transceivers. Additionally, or alternatively, the transmitter 316, the receiver 318, or both may include or correspond to one or more components of the UE 115 described with reference to FIG. 2.

Sensor 319 may include a camera, an ultrasound, a microphone, global positing system, a human machine interface (e.g., a touch screen), the like, or a combination thereof, as illustrative, non-limiting examples. I/O 320 may include a keypad, a touch screen, another I/O device, or a combination thereof, as illustrative, non-limiting example.

Interval adjuster 321 is configured to determine or select an interval, such as a V2X monitoring interval). For example, the interval may be selected from interval information 312. Additionally, or alternatively, interval adjuster 321 may calculate or generate the interval and store the interval as part of interval information 312. In some implementations, interval adjuster 321 may determine whether or not to adjust an interval and, based on a determination to adjust the interval, may increase or decrease the interval. For example, interval adjuster 321 may select, generate, or adjust an interval based on characteristics 310. In some implementations, interval adjuster 321 may include a machine learning capability to enable UE 115 to determine or select an interval or an interval adjustment.

The network entity 350 can include a variety of components (such as structural, hardware components) used for carrying out one or more functions described herein. For example, these components can include one or more processors 352 (hereinafter referred to collectively as "processor 352"), one or more memory devices 354 (hereinafter referred to collectively as "memory 354"), one or more transmitters 356 (hereinafter referred to collectively as "transmitter 356"), and one or more receivers 358 (hereinafter referred to collectively as "receiver 358"). The processor 352 may be configured to execute instructions stored in the memory 354 to perform the operations described herein. In some implementations, the processor 352 includes or corresponds to one or more of the receive processor 238, the transmit processor 220, and the controller/processor 240, and the memory 354 includes or corresponds to the memory 242.

The transmitter 356 is configured to transmit data to one or more other devices, and the receiver 358 is configured to receive data from one or more other devices. For example, the transmitter 356 may transmit data to, and the receiver 358 may receive data from, the UE 115. In some implementations, the transmitter 356 and the receiver 358 may be integrated in one or more transceivers. Additionally, or alternatively, the transmitter 356, the receiver 358, or both may include or correspond to one or more components of base station 105 described with reference to FIG. 2.

In some implementations, network entity 350 may include or correspond to a road side unit (RSU). The RSU may include a stationary infrastructure entity supporting V2X applications that can exchange messages with other entities supporting V2X applications. An RSU may be a logical entity that may combine V2X application logic with the functionality of an eNB (referred to as eNB-type RSU) or UE (referred to as UE-type RSU).

The V2X entity 360 can include a variety of components (such as structural, hardware components) used for carrying out one or more functions described herein. For example, these components can include one or more processors 362 (hereinafter referred to collectively as "processor 362"), one or more memory devices 364 (hereinafter referred to collectively as "memory 364"), one or more transmitters 366 (hereinafter referred to collectively as "transmitter 366"), and one or more receivers 368 (hereinafter referred to collectively as "receiver 368"). The processor 302 may be configured to execute instructions stored in the memory 364 to perform the operations described herein. In some implementations, the processor 362 includes or corresponds to one or more of the receive processor 258, the transmit processor 264, and the controller/processor 280, and the memory 364 includes or corresponds to the memory 282.

The transmitter 366 is configured to transmit data to one or more other devices, and the receiver 368 is configured to receive data from one or more other devices. For example, the transmitter 366 may transmit data to, and the receiver 368 may receive data from, the V2X entity 360. In some implementations, the transmitter 366 and the receiver 368 may be integrated in one or more transceivers. Additionally, or alternatively, the transmitter 366, the receiver 368, or both may include or correspond to one or more components of the UE 115 described with reference to FIG. 2.

In some implementations, the wireless communications system 300 implements a 5G New Radio (NR) network. For example, the UE 115 may include 5G-capable UEs and 5G capable base stations, such as UEs and base stations configured to operate in accordance with a 5G NR network protocol such as that defined by the 3rd Generation Partnership Project (3GPP).

During operation of the wireless communications system 300, UE 115 may determine whether or not to activate a V2X monitoring capability. For example, UE 115 may determine a location of UE 115 and may determine a proximity of UE 115 to a roadway. If the proximity is less than or equal to a threshold, UE 115 may activate the V2X monitoring capability. When the V2X capability is activated, UE 115 may determine characteristics 310 and, based on the characteristics 310, determine a first interval. In some implementations, the first interval may be determined based on a motion type of UE 115. UE 115 may monitor for V2X messages using the first interval.

During monitoring using the first interval, UE 115 may adjust the first interval to generate a second interval. For example, the second interval may be determined based on the motion type, one or more other characteristics, or a combination thereof. UE 115 may monitor for V2X message using the second interval. During monitoring using the first interval or the second interval, UE 115 may receive a message 370, such as a V2X message, from another device, such as V2X entity 360.

In some implementations, UE 115 may monitor for one or more V2X messages. For example, the UE 115 may monitor for the one or one or more V2X messages during a first monitoring period which is preceded or followed by a first interval. In some implementations, when the first monitoring period is followed by the first interval, the UE 115 may monitor for one or more V2X messages during a second monitoring period that follows the first interval. The second monitoring period may be greater than, equal to, or less than the first monitoring period. The second monitoring period may be followed by a second interval. The second interval may be longer or shorter than the first interval. UE 115 may not monitor for V2X messages during the first interval, the second interval, or both. For example, the first interval and the second interval may each be associated with a non-V2X-monitoring time period. In some implementations, UE 115 may select or determine a duration of the second interval during the first monitoring period, the first interval, or a combination thereof.

Thus, FIG. 3 describes UE 115 configured for dynamic adjustment of a monitoring interval. By adjusting the monitoring interval, such as a V2X message monitoring interval, UE 115 may monitor for one or more V2X messages (e.g., 370) may dynamically determine an appropriate monitoring interval for real-time conditions. Accordingly, UE 115 may frequently monitor for V2X message is hazardous situations and may monitor less frequently in relatively non-hazardous situations. By adjusting the monitoring interval, such as a V2X message monitoring interval, UE 115 may expend power in manner appropriate for a current situation.

Figure 4A:
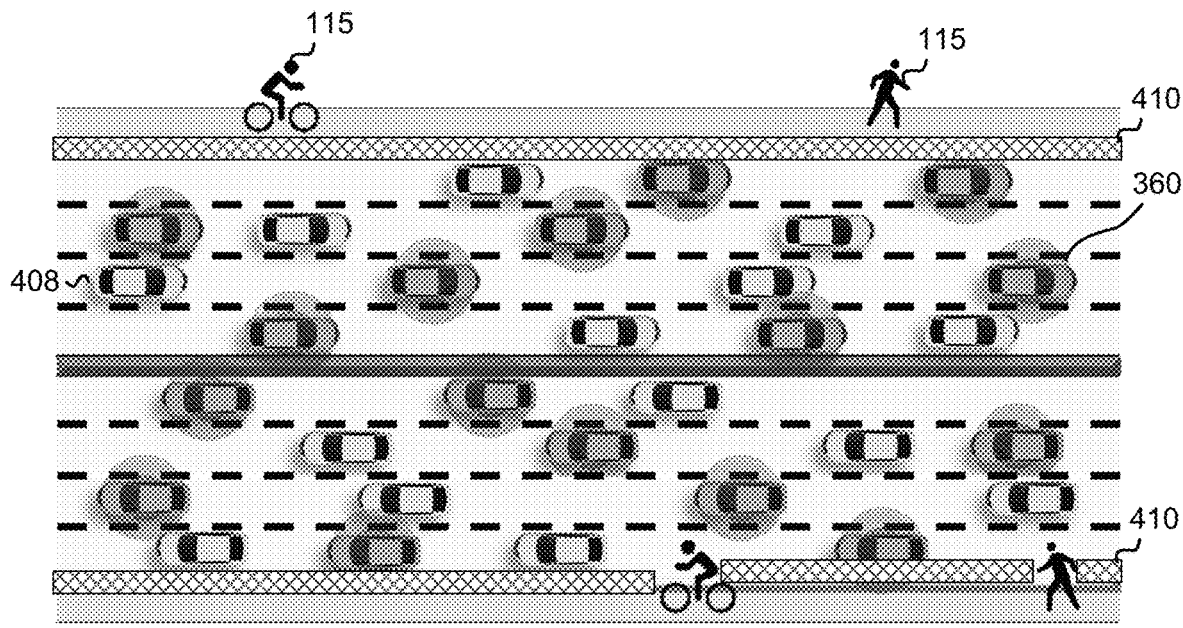
FIGS. 4A, 4B, 5A, 5B, 5C, 6A, and 6B are diagrams conceptually illustrating examples of V2X message monitoring.
Figure 4B:
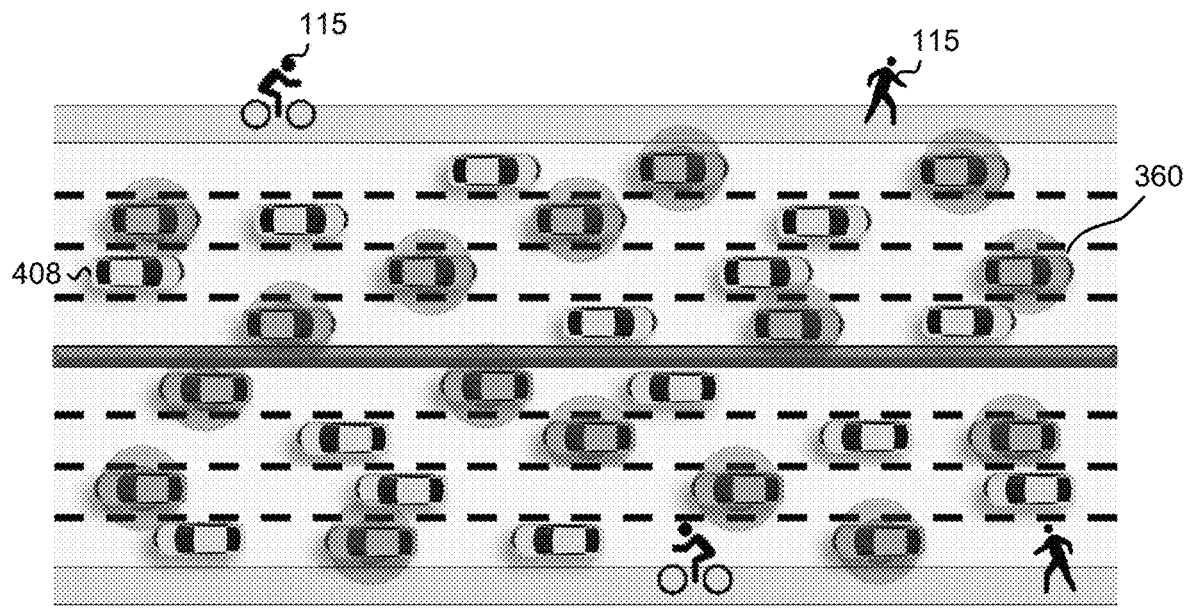

Referring to FIGS. 4A, 4B, 5A, 5B, 5C, 6A, and 6B are diagrams conceptually illustrating examples of V2X message monitoring. For example, FIGS. 4A and 4B show a high speed road. As an illustrative example, the high speed road may correspond to a speed limit of greater than or equal to 35 miles per hour. Each of FIGS. 4A and 4B include one or more UEs 115, one or more V2X entities, and one or more non-V2X entities.

Referring to Figure to FIGS. 4A, a UE 115 is located on a walkway that is separated or elevated with respect to a roadway. For example, a physical barrier 410 may separate or be interposed between UE 115 and the roadway. Physical separation of the walkway enables UE 115 to increase a V2X monitoring interval. To illustrate, physical barrier 410 provides protection for UE 115 from vehicles. UE 115 may determine, via mapping data or sensor data, that the device is positioned on a dedicated pathway or that physical barrier 410 is present. Accordingly, UE 115 may determine that UE 115 is in a relatively safe, non-hazardous position. UE 115 may increase a V2X monitoring interval.

Referring to FIG. 4B, a UE 115 located on a walkway that is not separated or elevated with respect to a roadway. For example, no physical barrier may separate or be interposed between UE 115 and the roadway. UE 115 may determine, via mapping data or sensor data, that the device is positioned on a pathway that is not a dedicated pathway and that no physical barrier 410 is present. A lack of a physical separation between UE 115 and the roadway may cause UE 115 to decrease V2X monitoring interval. Thus, the UE 115 of FIG. 4A may monitor for V2X messages more frequently as compared to the UE 115 of FIG. 4B.

Figure 5A:
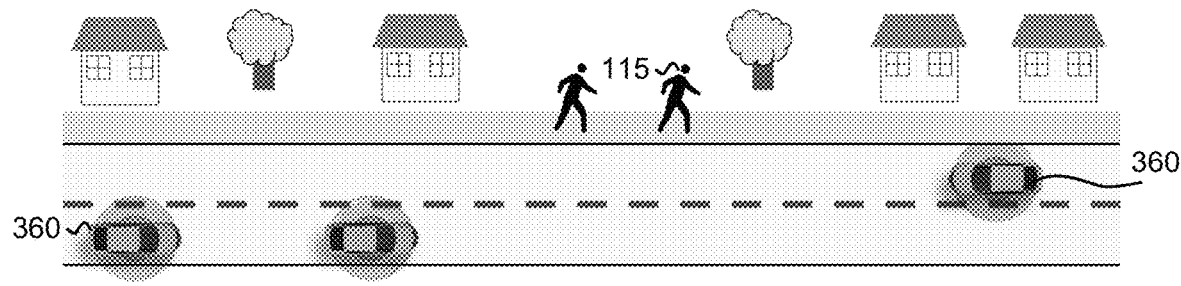
Figure 5B:
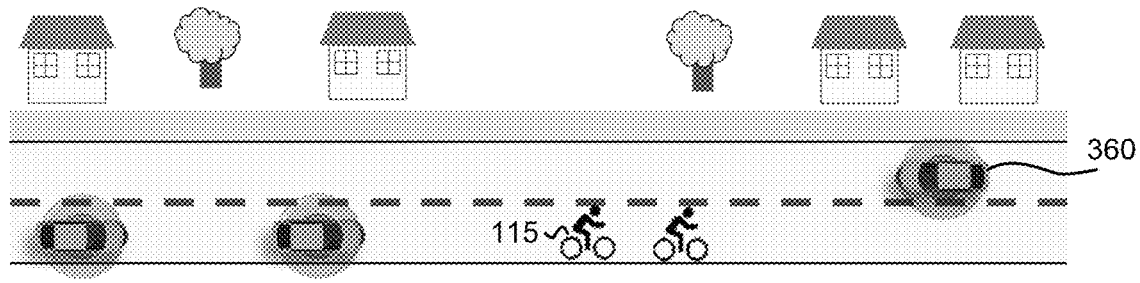
Figure 5C:
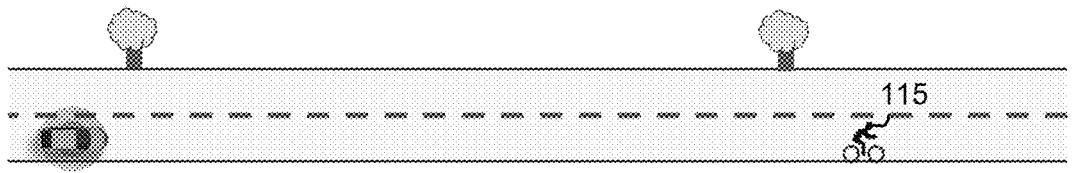

Referring to FIGS. 5A, 5B, 5C, FIGS. 5A and 5B show a low speed road, and FIG. 5C shows a country road. The low speed road may be associated with a speed limit of less than or equal to 35 miles per hour. With reference to FIGS. 5A, 5B, 5C, the UE 115 may determine a V2X monitoring interval based on a sensor, map information, based on a received V2X message, or a combination thereof.

Referring to FIG. 5A, the UE 115 corresponds to a pedestrian. Based on the low speed road and associated speed limit, the pedestrian may have a relatively quick reaction time—e.g., a pedestrian may quickly stop, change direction, or change speed. In some implementations, the UE 115 may determine that a motion type of the UE 115 corresponds to walking, jogging, or running. Additionally, or alternatively, the UE 115 may determine, based on mapping information, location data, sensor data, or a combination thereof, that UE 115 is on a walkway adjacent to the roadway. Based on the road, motion type, mapping information, location data, sensor data, or a combination thereof, the UE 115 may increase a V2X monitoring interval to monitor less frequently for V2X messages.

Referring to FIG. 5B, the UE 115 corresponds to a bicycle. Based on the bicycle and a speed thereof, a reaction time may be relatively slow—e.g., a user of may not be able to quickly stop, change direction, or change speed. In some implementations, the UE 115 may determine that a motion type of the UE 115 corresponds to cycling. Additionally, or alternatively, the UE 115 may determine, based on mapping information, location data, sensor data, or a combination thereof, that UE 115 is on the roadway. Based on the road, motion type, mapping information, location data, sensor data, or a combination thereof, the UE 115 may decrease a V2X monitoring interval and monitor for V2X messages more frequently as compared to the UE 115 of FIG. 5A.

Referring to FIG. 5C, the UE 115 corresponds to a bicycle. Additionally, the UE 115 may determine a location of the UE 115. For example, the UE 115 may determine that the UE is on a rural road as compared to a city road or a suburban road. Based on the road, motion type, mapping information, location data, sensor data, or a combination thereof, the UE 115 may increase a V2X monitoring interval to monitor less frequently for V2X messages. Additionally, based on receiving one or more V2X messages, the UE 115 may determine that vehicular traffic is present and may decrease the V2X monitoring interval to monitor more frequently for V2X messages. In some implementations, the UE 115 may determine, based on the one or more V2X messages, whether a vehicle is approaching and, based on a determination that the vehicle is approaching, may decrease the V2X monitoring interval.

Figure 6A:
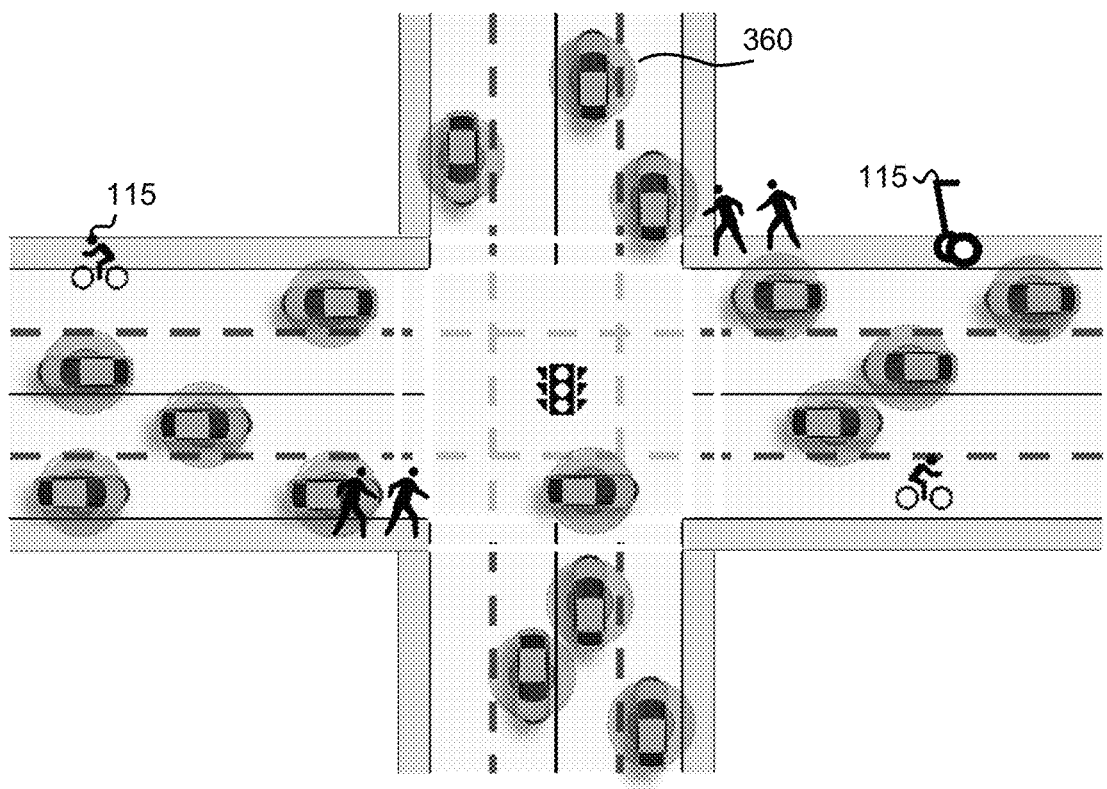
Figure 6B:
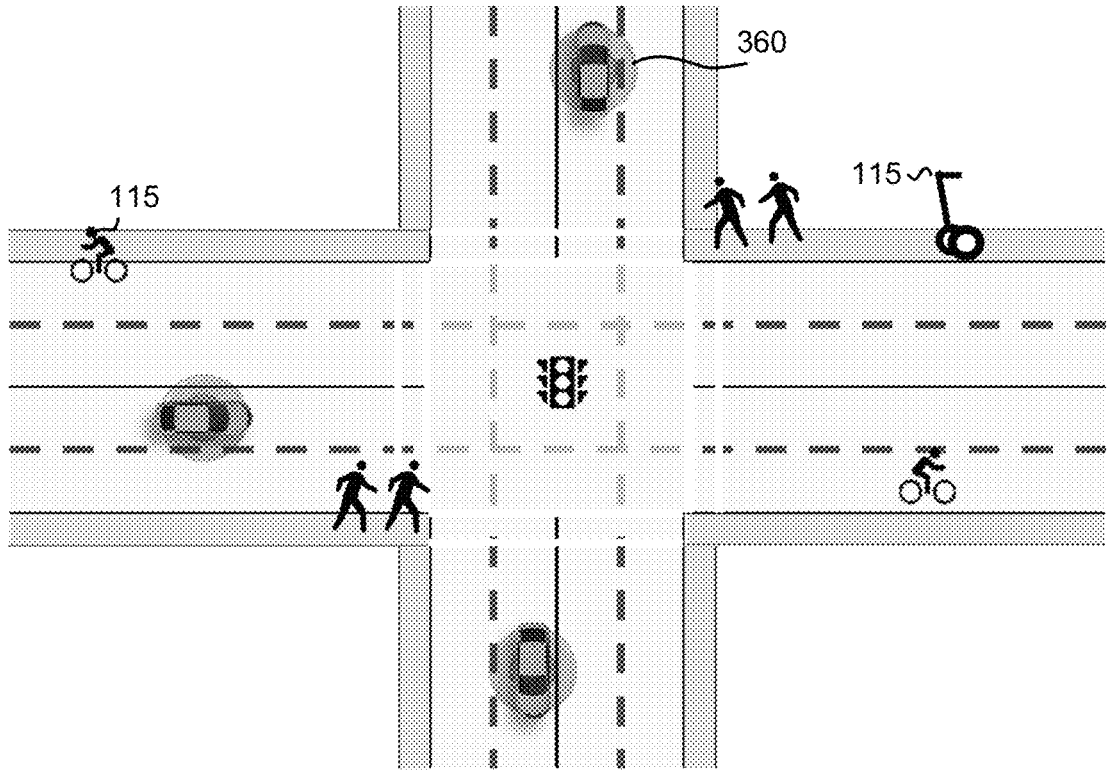

Referring to FIGS. 6A and 6B, FIGS. 6A and 6B show an intersection. In FIG. 6A as compared to FIG. 6B, FIG. 6A shows the intersection at a first time (e.g., rush hour) with high traffic, and FIG. 6B shows the intersection at a second time (e.g., non-rush hour) with light traffic. In each of FIGS. 6A and 6B, the UE 115 may determine to reduce a V2X monitoring interval and thereby monitor more frequently for V2X messages because of hazards associated with an intersection. However, the UE 115 may determine to monitor more frequently with reference to FIG. 6A as compared to FIG. 6B based on the time of day, an amount of traffic, or a combination thereof.

Figure 7:
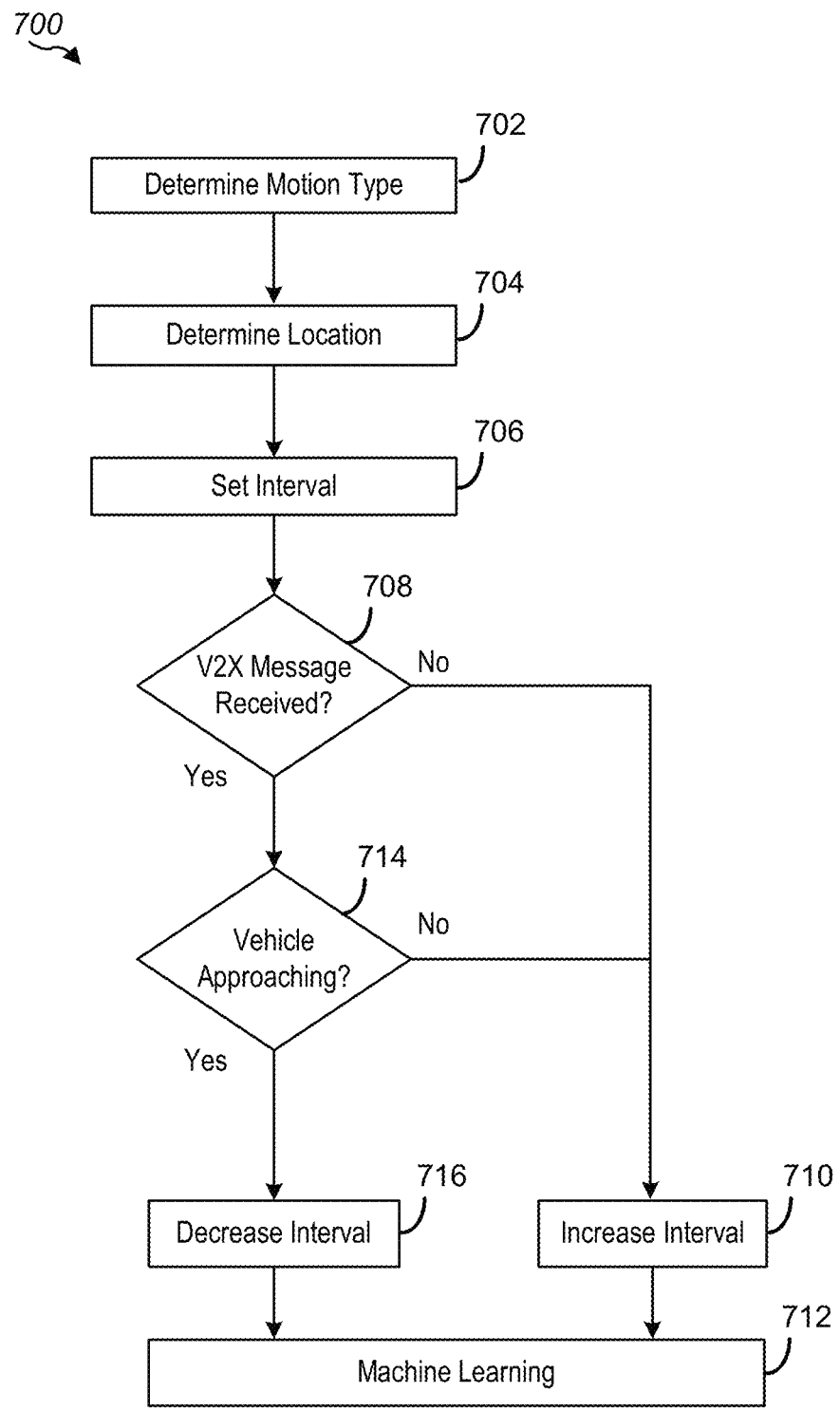
FIG. 7 is a flow diagram illustrating an example process of UE operations for communication.
Figure 8:
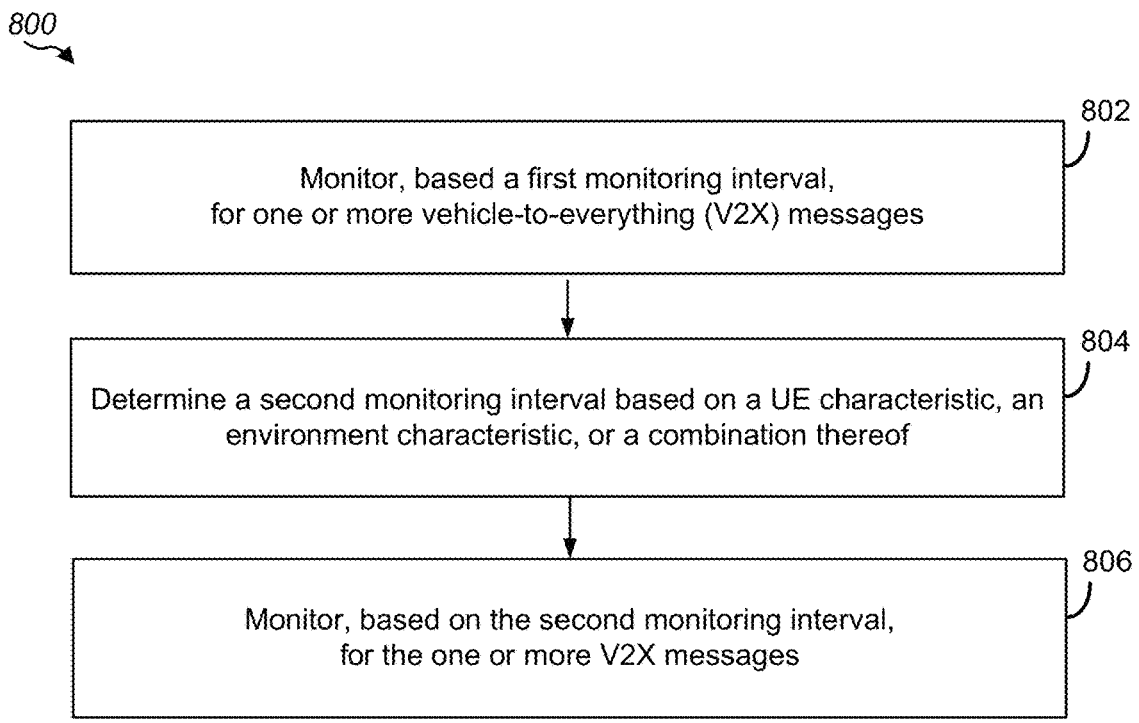
FIG. 8 is a flow diagram illustrating another example process of UE operations for communication.
Figure 9:
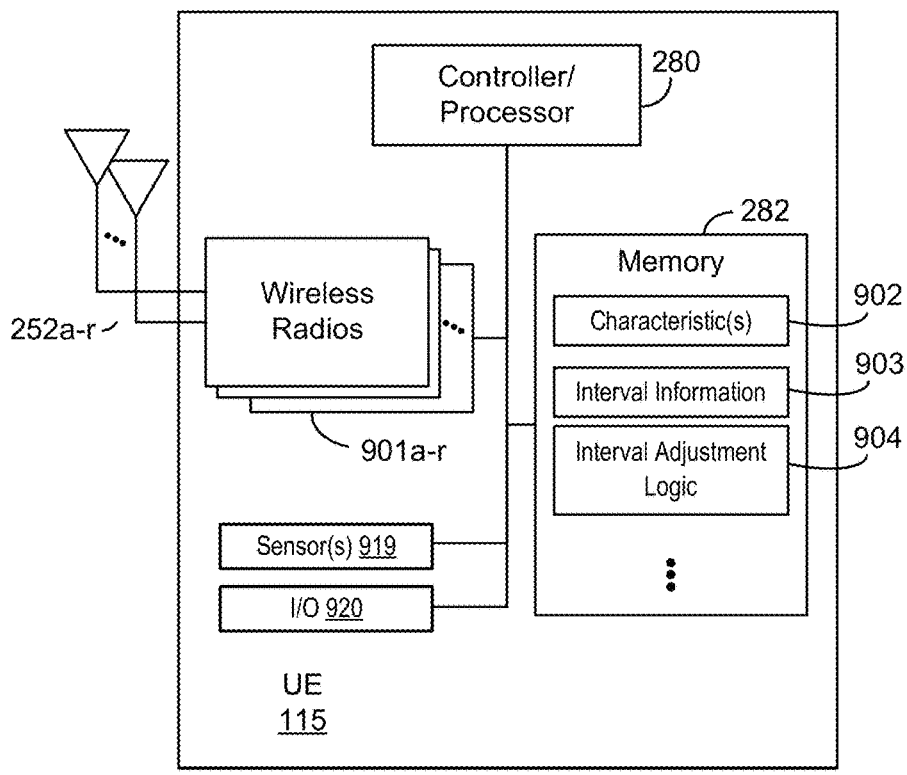
FIG. 9 is a block diagram conceptually illustrating a design of a UE.

Referring to FIGS. 7 and 8, a flow diagrams illustrating examples processes 700, 800 performed by a UE for communication, respectively, are shown. For example, example blocks of the processes 700, 800 may cause the UE to monitor a V2X message, according to some aspects of the present disclosure. The example blocks will also be described with respect to the UE 115 as illustrated in FIG. 9. FIG. 9 is a block diagram conceptually illustrating a design of a UE. The UE may be configured to perform one or more operations to monitor a V2X message, according to one aspect of the present disclosure. The UE 115 includes the structure, hardware, and components as illustrated for the UE 115 of FIG. 2 or 3. For example, the UE 115 includes the controller/processor 280, which operates to execute logic or computer instructions stored in the memory 282, as well as controlling the components of the UE 115 that provide the features and functionality of the UE 115. The UE 115, under control of the controller/processor 280, transmits and receives signals via wireless radios 901a-r and the antennas 252a-r. The wireless radios 901a-r include various components and hardware, as illustrated in FIG. 2 for the UE 115, including the modulator/demodulators 254a-r, the MIMO detector 256, the receive processor 258, the transmit processor 264, and the TX MIMO processor 266. The UE 115 also includes one or more sensors 919 and one or more I/O devices 920. The one or more sensors 919 and the one or more I/O devices may include or correspond to sensor 319 and I/O 320.

Figure 10:
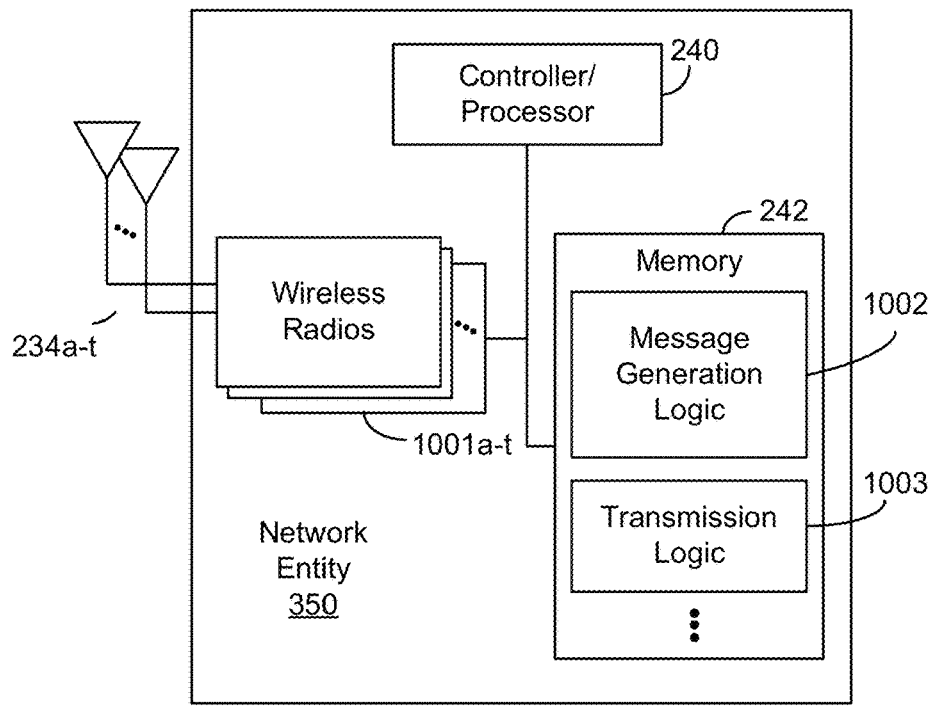
FIG. 10 is a block diagram conceptually illustrating a design of a network entity.
Figure 11:
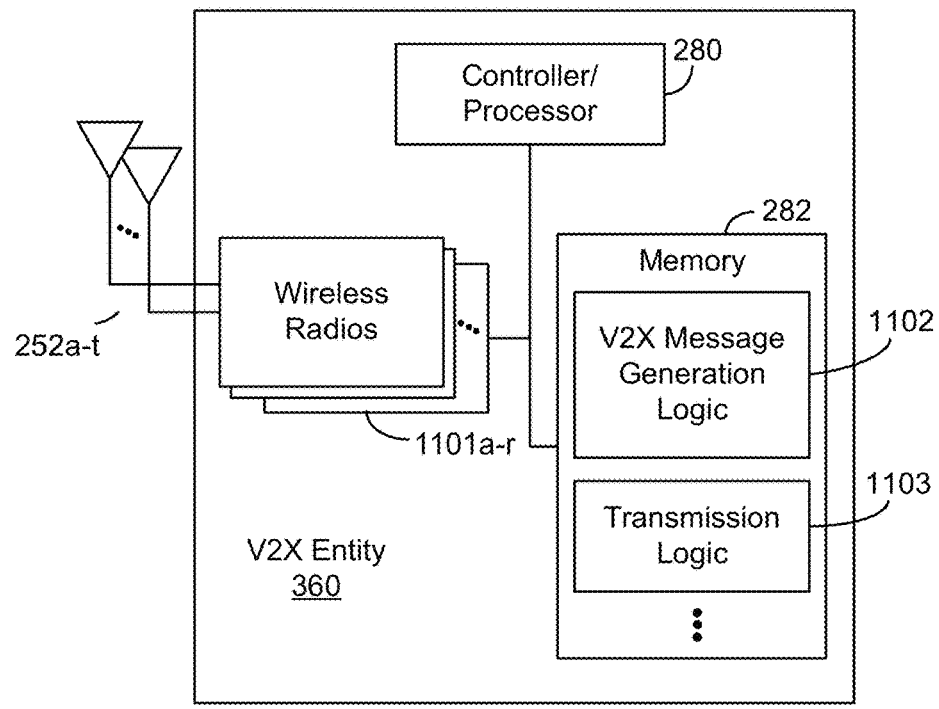
FIG. 11 is a block diagram conceptually illustrating a design of a vehicle-to-everything (V2X) entity.

As shown, the memory 282 may include one or more characteristics 902, interval information 903, and interval adjustment logic 904. The one or more characteristics 902 and interval information 903 may include or correspond to characteristic 310 and interval information 312, respectively. The interval adjustment logic 904 may include or correspond to interval adjuster 321. The UE 115 may receive signals from or transmit signals to one or more network entities, such as another UE 115, the base station 105, the network entity 350 of FIG. 3, a core network, a core network device, a network entity as illustrated in FIG. 10, a V2X entity 360 of FIG. 3, or a V2X entity as illustrated in FIG. 11.

Referring to FIG. 7, a flow diagram illustrating an example process 700 of UE operations for communication is shown. In some implementations, the process 700 may be performed by the UE 115. In some other implementations, the process 700 may be performed by an apparatus configured for wireless communication. For example, the apparatus may include at least one processor, and a memory coupled to the processor. The processor may be configured to perform operations of the process 700. In some other implementations, the process 700 may be performed or executed using a non-transitory computer-readable medium having program code recorded thereon. The program code may be program code executable by a computer for causing the computer to perform operations of the process 700.

As illustrated at block 702, the UE determines a motion type of the UE. The motion type may include or correspond to interval information 312 For example, the motion type may indicate a type of motion, such as walking, jogging, running, cycling, skating, rolling, driving, riding, a micromobility riding, or the like, associated with the UE. In some implementations, the motion type may correspond to motion of a user of the UE.

At block 704, the UE determines a location of the UE. For example, the UE may determine the location using a sensor, such as a GPS of the UE. As another example, the UE may determine the location based on location data received from another device, such as network entity 350 or V2X entity 360.

At block 706, the UE sets an interval, such as a monitoring interval for one or more V2X messages. The interval may include or correspond to interval information 312. In some implementations, the interval may be determined or selected based on the motion type and the location. Additionally, or alternatively, the interval may be selected based on data, such as historical data, from the UE or from another UE. The historical data may correspond the UE, or another UE, having a similar or the same motion type associated with the location. After the interval is set at block 706, the UE may monitor for one or more V2X messages based on the interval.

At block 708, the UE determines whether a V2X message has been increased. Based on a determination that a V2X message has not been received, the UE increases the interval at block 710. To illustrate, if no V2X message is received, the UE may determine that the UE may monitor for V2X message less frequently and thereby conserver power. After increasing the interval at block 710, the UE may monitor for one or more V2X messages based on the increased interval. Additionally, or alternately, after increasing the interval at block 710, the UE may perform machine learning 712, which may refine future decisions by the UE of whether to increase or decrease the interval, based on characteristics (e.g., 310) in various conditions. Based on a determination that a V2X message has been received, processing advances to block 714.

At block 714, the UE determines whether a vehicle, such as a V2X entity (e.g., 360), is approaching. As illustrative, non-limiting examples, the UE may determine whether the vehicle is approaching based on sensor data or based on one or more received V2X message, such as position/location information included in a received V2X message. Based on a determination that the vehicle is not approaching, the UE increases the interval at block 710. To illustrate, if no vehicle is approaching the UE, then the UE may determine that the conditions are relatively non-hazardous and the UE may monitor for V2X message less frequently and thereby conserver power. Alternatively, based on a determination that the vehicle is approaching, the UE decreases the interval at block 716. To illustrate, if the vehicle is approaching, the UE may determine that the more V2X messages may be available and may monitor for V2X message more frequently. After decreasing the interval at block 716, the UE may monitor for one or more V2X messages based on the decreased interval. Additionally, or alternately, after decreasing the interval at block 716, the UE may perform machine learning 712.

Thus, the process 700 enables the UE to adjust a monitoring interval based on one or more characteristics, such as a UE characteristic or an environment characteristic. By adjusting the monitoring interval, such as a V2X message monitoring interval, the UE may monitor for one or more V2X message may dynamically determine an appropriate monitoring interval for real-time conditions. Accordingly, the UE may frequently monitor for V2X message is hazardous situations and may monitor less frequently in relatively non-hazardous situations. By adjusting the monitoring interval, such as a V2X message monitoring interval, the UE may expend power in manner appropriate for a current situation.

Referring to FIG. 8, a flow diagram illustrating an example process 800 of UE operations for communication is shown. In some implementations, the process 800 may be performed by the UE 115. In some other implementations, the process 800 may be performed by an apparatus configured for wireless communication. For example, the apparatus may include at least one processor, and a memory coupled to the processor. The processor may be configured to perform operations of the process 800. In some other implementations, the process 800 may be performed or executed using a non-transitory computer-readable medium having program code recorded thereon. The program code may be program code executable by a computer for causing the computer to perform operations of the process 800.

As illustrated at block 802, UE monitors, based on a first monitoring interval, for one or more vehicle-to-everything (V2X) messages. The first monitoring interval may include or correspond to the interval information 903. The UE 115 may monitor for the one or more V2X messages using processor 280 via wireless radios 901a-r and the antennas 252a-r. In some implementations, the process 800 may further include receiving a first V2X message during monitoring based on the first monitoring interval.

At block 804, the UE determines a second monitoring interval based on a UE characteristic, an environment characteristic, or a combination thereof. The UE characteristic, the environment characteristic, or the combination thereof may include or correspond to the one or more characteristics 902. The UE 115 may execute, under control of the controller/processor 280, the interval adjustment logic 904 stored in the memory 282. The execution environment of the interval adjustment logic 904 provides the functionality to determine the second monitoring interval. In some implementations, determining the second monitoring interval includes adjusting the first monitoring interval.

At block 806, the UE monitors, based on the second monitoring interval, for the one or more V2X messages. The second monitoring interval may include or correspond to the interval information 903. The UE 115 may monitor for the one or more V2X messages using processor 280 via wireless radios 901a-r and the antennas 252a-r. In some implementations, the UE receives a second V2X message during monitoring based on the second monitoring interval.

In some implementations, each of the first monitoring interval and the second monitoring interval are associated with a non-monitoring time period. the first monitoring interval is different form the second monitoring interval. the second monitoring interval is longer than the first monitoring interval. the second monitoring interval is shorter than the first monitoring interval.

In some implementations, process 800 may also include the UE determining a motion type of the UE. The motion type may include walking, jogging, running, cycling, skating, rolling, driving, riding, a micro-mobility riding, or the like, as illustrative, non-limiting examples. In some implementations, the motion type includes a speed of the UE, such as a specific speed, a speed range, an average speed, or a combination thereof. The UE may determine the first monitoring interval or the second monitoring interval based on the motion type.

In some implementations, the UE characteristic includes a static UE characteristic, a dynamic UE characteristic, or a combination thereof. The static UE characteristic may include a device type, a motion type, a user input, a device capability, or a combination thereof, as illustrative, non-limiting examples. The dynamic UE characteristic may include a location, a motion state, a speed, sensor data, a user input, or a combination thereof, as illustrative, non-limiting examples. Additionally, or alternatively, the environment characteristic may include a static environment characteristic, a dynamic environment characteristic, or a combination thereof. The static environment characteristic includes map information, walkway information, roadway information, topography information, injury/accident information, or a combination thereof, as illustrative, non-limiting examples. The dynamic environment characteristic includes traffic information, weather information, emergency information, a received V2X message, or a combination thereof, as illustrative, non-limiting examples.

In some implementations, process 800 includes the UE performing machine learning based on the first monitoring interval, the second monitoring interval, the UE characteristic, the environment characteristic, or a combination thereof. Additionally, or alternatively, process 800 may also include generating a notification of a hazard based on a received V2X message.

Thus, the process 800 enables the UE to adjust a monitoring interval based on one or more characteristics, such as a UE characteristic or an environment characteristic. By adjusting the monitoring interval, such as a V2X message monitoring interval, the UE may monitor for one or more V2X message may dynamically determine an appropriate monitoring interval for real-time conditions. Accordingly, the UE may frequently monitor for V2X message is hazardous situations and may monitor less frequently in relatively non-hazardous situations. By adjusting the monitoring interval, such as a V2X message monitoring interval, the UE may expend power in manner appropriate for a current situation.

FIG. 10 is a block diagram conceptually illustrating a design of a network entity 350. The network entity 350 may include the base station 105, a network, or a core network, as illustrative, non-limiting examples. The network entity 350 includes the structure, hardware, and components as illustrated for the base station 105 of FIGS. 1 and 2, the network entity 350 of FIG. 3, or a combination thereof. For example, the network entity 350 may include the controller/processor 240, which operates to execute logic or computer instructions stored in the memory 242, as well as controlling the components of the network entity 350 that provide the features and functionality of the network entity 350. The network entity 350, under control of the controller/processor 240, transmits and receives signals via wireless radios 1001a-t and the antennas 234a-t. The wireless radios 1001a-t include various components and hardware, as illustrated in FIG. 2 for the network entity 350 (such as the base station 105), including the modulator/demodulators 232a-t, the transmit processor 220, the TX MIMO processor 230, the MIMO detector 236, and the receive processor 238.

As shown, the memory 242 may include message generation logic 1002 and transmission logic 1003. The network entity 350 may receive signals from or transmit signals to one or more UEs, such as UE 115 of FIGS. 1-3, and one or more V2X entities, such as the V2X entity 360 of FIGS. 1-3.

FIG. 11 is a block diagram conceptually illustrating a design of a V2X entity 360. The V2X entity 360 includes the structure, hardware, and components as illustrated for the UE 105 of FIGS. 1 and 2, the V2X entity 360 of FIG. 3, or a combination thereof. Additionally, or alternatively, By way of example, the V2X entity 360 may be a stationary entity, such as a road side unit, but alternatively may be a non-stationary entity, such as a vehicle or a UE carried by a pedestrian. The V2X entity 360 includes the structure, hardware, and components as illustrated for the UE 115 of FIG. 2 or 3. For example, the V2X entity 360 includes the controller/processor 280, which operates to execute logic or computer instructions stored in the memory 282, as well as controlling the components of the V2X entity 360 that provide the features and functionality of the V2X entity 360. The V2X entity 360, under control of the controller/processor 280, transmits and receives signals via wireless radios 1101a-r and the antennas 252a-r. The wireless radios 1101a-r include various components and hardware, as illustrated in FIG. 2 for the V2X entity 360, including the modulator/demodulators 254a-r, the MIMO detector 256, the receive processor 258, the transmit processor 264, and the TX MIMO processor 266.

As shown, the memory 282 may include V2X message generation logic 1102 and transmission logic 1103. The V2X entity 360 may receive signals from or transmit signals to one or more network entities, such as the base station 105, the network entity 350 of FIG. 3, a core network, a core network device, a network entity as illustrated in FIG. 10, or one or more UEs 115 of FIGS. 1-3, 4A, 4B, 5A, 5B, 5C, 6, 7, 9.

It is noted that one or more blocks (or operations) described with reference to FIG. 7 or 8 may be combined with one or more blocks (or operations) of another of figure. For example, one or more blocks (or operations) of FIG. 7 may be combined with one or more blocks (or operations) FIG. 8. As another example, one or more blocks of FIG. 7 or 8 may be combined with one or more blocks (or operations) of another of FIG. 2 or 3. Additionally, or alternatively, one or more operations described above with reference to FIGS. 1-7 may be combine with one or more operations described with reference to one or more of FIGS. 9-11.

In some aspects, techniques for enabling V2X message monitoring may include additional aspects, such as any single aspect or any combination of aspects described below or in connection with one or more other processes or devices described elsewhere herein. In a first aspect, enabling V2X message monitoring may include an apparatus monitoring, based on a first monitoring interval, for one or more vehicle-to-everything (V2X) messages; determining a second monitoring interval based on a UE characteristic, an environment characteristic, or a combination thereof; and monitoring, based on the second monitoring interval, for the one or more V2X messages. In some examples, the techniques in the first aspect may be implemented in a method or process. In some other examples, the techniques of the first aspect may be implemented in a wireless communication device such as a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a second aspect, in combination with the first aspect, that apparatus further determines a motion type of the apparatus.

In a third aspect, in combination with the second aspect, the motion type includes walking, jogging, running, cycling, skating, rolling, driving, riding, or a micro-mobility riding.

In a fourth aspect, in combination with one or more of the first through third aspects, the motion type includes a speed of the apparatus.

In a fifth aspect, in combination with one or more of the first through fourth aspects, the apparatus further determines the first monitoring interval or the second monitoring interval based on the motion type.

In a sixth aspect, in combination with one or more of the first through fifth aspects, the UE characteristic includes a static UE characteristic, a dynamic UE characteristic, or a combination thereof.

In a seventh aspect, in combination with the sixth aspect, the static UE characteristic includes a device type, a motion type, a user input, a device capability, or a combination thereof.

In an eighth aspect, in combination with one or more of the sixth through seventh aspects, the dynamic UE characteristic includes a location, a motion state, a speed, sensor data, a user input, or a combination thereof.

In a ninth aspect, in combination with one or more of the sixth through eighth aspects, the environment characteristic includes a static environment characteristic, a dynamic environment characteristic, or a combination thereof.

In a tenth aspect, in combination with the ninth aspect, the static environment characteristic includes map information, walkway information, roadway information, topography information, injury/accident information, or a combination thereof.

In an eleventh aspect, in combination with one or more of the ninth through tenth aspects, the dynamic environment characteristic includes traffic information, weather information, emergency information, one or more received V2X messages, or a combination thereof.

In a twelfth aspect, in combination with one or more of the first through eleventh aspects, each of the first monitoring interval and the second monitoring interval are associated with a non-monitoring time period.

In a thirteenth aspect, in combination with one or more of the first through twelfth aspects, the second monitoring interval is longer than the first monitoring interval.

In a fourteenth aspect, in combination with one or more of the first through twelfth aspects, the second monitoring interval is shorter than the first monitoring interval.

In a fifteenth aspect, in combination with one or more of the first through fourteenth aspects, to determine the second monitoring interval, the apparatus adjusts the first monitoring interval.

In a sixteenth aspect, in combination with one or more of the first through fifteenth aspects, the apparatus further receives a first V2X message during monitoring based on the first monitoring interval.

In a seventeenth aspect, in combination with one or more of the first through sixteenth aspects, the apparatus further receives a second V2X message during monitoring based on the second monitoring interval.

In an eighteenth aspect, in combination with one or more of the first through seventeenth aspects, the apparatus further performs machine learning based on the first monitoring interval, the second monitoring interval, the UE characteristic, the environment characteristic, or a combination thereof.

In a nineteenth aspect, in combination with one or more of the first through the eighteenth aspect, the apparatus further generates generating a notification of a hazard based on a received V2X message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-3, 4A, 4B, 5A, 5B, 6A, 6B, and 7-11 include processors, electronics devices, hardware devices, electronics components, logical circuits, memories, software codes, firmware codes, etc., or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed at a user equipment (UE), comprising:
    monitoring, based on a first monitoring interval, for one or more vehicle-to-everything (V2X) messages;
    monitoring, based on a second monitoring interval, for the one or more V2X messages, the second monitoring interval determined based on a UE characteristic associated with the UE, the first monitoring interval, an environment characteristic, or a combination thereof;
    determining a motion type of the UE; and
    determining the first monitoring interval or the second monitoring interval based on the motion type.

2. The method of claim 1, wherein the motion type includes walking, jogging, running, cycling, skating, rolling, driving, riding, or a micro-mobility riding, and wherein determining the motion type of the UE further includes determining a speed of the UE.

3. The method of claim 1, further comprising adjusting the second monitoring interval via machine learning, the machine learning performed based on the first monitoring interval, the second monitoring interval, and an environment characteristic.

4. The method of claim 1, wherein the UE characteristic includes a static UE characteristic, a dynamic UE characteristic, or a combination thereof.

5. The method of claim 4, wherein the static UE characteristic includes a device type, a motion type, a user input, a device capability, or a combination thereof.

6. The method of claim 4, wherein the dynamic UE characteristic includes a location of the UE, a motion state of the UE, a speed of the UE, or a combination thereof.

7. The method of claim 1, wherein the environment characteristic includes a static environment characteristic, a dynamic environment characteristic, or a combination thereof.

8. The method of claim 7, wherein the static environment characteristic includes map information, walkway information, roadway information, topography information, injury/accident information, or a combination thereof.

9. The method of claim 7, wherein the dynamic environment characteristic includes traffic information, weather information, emergency information, one or more received V2X messages, or a combination thereof.

10. The method of claim 1, wherein:
    each of the first monitoring interval and the second monitoring interval are associated with a non-monitoring time period; and
    the second monitoring interval is longer than or shorter than the first monitoring interval.

11. The method of claim 1, further comprising:
    determining the second monitoring interval, wherein determining the second monitoring interval includes adjusting the first monitoring interval.

12. The method of claim 1, further comprising:
    receiving a first V2X message during monitoring based on the first monitoring interval; and
    receiving a second V2X message during monitoring based on the second monitoring interval.

13. The method of claim 1, further comprising performing machine learning based on the first monitoring interval, the second monitoring interval, and an environment characteristic.

14. The method of claim 1, further comprising generating a notification of a hazard based on a received V2X message.

15. A user equipment (UE) comprising:
    at least one processor; and
    a memory coupled with the at least one processor and storing processor-readable code that, when executed by the at least one processor, is configured to:
    monitor, based on a first monitoring interval, for one or more vehicle-to-everything (V2X) messages;
    monitor, based on a second monitoring interval, for the one or more V2X messages, the second monitoring interval determined based on a UE characteristic associated with the UE, the first monitoring interval, an environment characteristic, or a combination thereof;
    determine a motion type of the UE; and
    determine the first monitoring interval or the second monitoring interval based on the motion type.

16. The UE of claim 15, wherein the motion type includes walking, jogging, running, cycling, skating, a micro-mobility riding.

17. The UE of claim 15, wherein the UE characteristic includes a static UE characteristic, a dynamic UE characteristic, or a combination thereof.

18. The UE of claim 17, wherein:
the static UE characteristic includes a device type, a motion type, a user input, a device capability, or a combination thereof; or
the environment characteristic includes a static environment characteristic, a dynamic environment characteristic, or a combination thereof.

19. The UE of claim 18, wherein:
the static UE characteristic includes a device type, a motion type, a user input, a device capability, or a combination thereof;
the dynamic UE characteristic includes a location, a motion state, a speed, sensor data, a user input, or a combination thereof;
the static environment characteristic includes map information, walkway information, roadway information, topography information, injury/accident information, or a combination thereof; or
the dynamic environment characteristic includes traffic information, weather information, emergency information, one or more received V2X messages, or a combination thereof.

20. The UE of claim 15, wherein each of the first monitoring interval and the second monitoring interval are associated with a non-monitoring time period.

21. The UE of claim 20, wherein the first monitoring interval is different from the second monitoring interval.

22. The UE of claim 20, wherein the second monitoring interval is longer than the first monitoring interval.

23. The UE of claim 15, wherein the processor-readable code, when executed by the at least one processor, is further configured to:
receive a first V2X message during monitoring based on the first monitoring interval; and
receive a second V2X message during monitoring based on the second monitoring interval.

24. An apparatus configured for wireless communication, the apparatus comprising:
means for monitoring for one or more vehicle-to-everything (V2X) messages based on a first monitoring interval;
means for monitoring for the one or more V2X messages based on a second monitoring interval, the second monitoring interval determined based on a UE characteristic associated with the UE, the first monitoring interval, an environment characteristic, or a combination thereof;
means for determining a motion type of the UE; and
means for determining the first monitoring interval or the second monitoring interval based on the motion type.

25. A non-transitory computer-readable medium storing instructions that, when executed by a processor, cause the processor to perform operations comprising:
monitoring for one or more vehicle-to-everything (V2X) messages based on a first monitoring interval;
monitoring for the one or more V2X messages based on a second monitoring interval, the second monitoring interval determined based on a UE characteristic associated with the UE, the first monitoring interval, an environment characteristic, or a combination thereof;
determining a motion type of the UE; and
determining the first monitoring interval or the second monitoring interval based on the motion type.

26. The method of claim 1, wherein the environment characteristic includes a detected hazard situation, and wherein, in response to the detected hazard situation, the second monitoring interval is shorter than the first monitoring interval.

27. The method of claim 1 further comprising, adjusting the first monitoring interval to generate the second monitoring interval.

* * * * *